(12) United States Patent
Whynot et al.

(10) Patent No.: US 9,906,568 B2
(45) Date of Patent: Feb. 27, 2018

(54) HYBRID CLOUD MEDIA ARCHITECTURE FOR MEDIA COMMUNICATIONS

(71) Applicant: Avaya Inc., Santa Clara, CA (US)

(72) Inventors: Stephen R. Whynot, Allen, TX (US);
David Mcknight, Garland, TX (US);
Greg Osterhout, Coppell, TX (US)

(73) Assignee: Avaya Inc., Santa Clara, CA (US)

( * ) Notice: Subject to any disclaimer, the term of this patent is extended or adjusted under 35 U.S.C. 154(b) by 381 days.

(21) Appl. No.: 14/472,206

(22) Filed: Aug. 28, 2014

(65) Prior Publication Data
US 2016/0065623 A1  Mar. 3, 2016

(51) Int. Cl.
*G06F 15/16* (2006.01)
*H04L 29/06* (2006.01)
*H04L 29/08* (2006.01)

(52) U.S. Cl.
CPC ...... *H04L 65/1069* (2013.01); *H04L 65/1006* (2013.01); *H04L 67/02* (2013.01); *H04L 67/18* (2013.01); *H04L 67/28* (2013.01)

(58) Field of Classification Search
CPC ..... H04L 65/1006; H04L 67/16; H04L 67/18; H04L 67/22; H04L 67/24
USPC ........................................................ 709/227
See application file for complete search history.

(56) References Cited

U.S. PATENT DOCUMENTS

| 8,457,140 B2* | 6/2013 | Demilie | H04M 3/42272 370/401 |
| 8,468,126 B2* | 6/2013 | van Gent | G06F 17/3089 707/610 |
| 8,526,576 B1* | 9/2013 | Deich | H04M 11/04 370/352 |
| 8,861,537 B1* | 10/2014 | Braithwaite | 370/401 |

(Continued)

FOREIGN PATENT DOCUMENTS

| WO | WO 2014/039865 | 3/2014 |
| WO | WO 2014/094798 | 6/2014 |

OTHER PUBLICATIONS

Vanecek et al. "Enabling Hybrid Services in Emerging Data Networks," IEEE Communications Magazine, Jul. 1999, vol. 37, No. 7, pp. 102-109.

(Continued)

*Primary Examiner* — Kristie Shingles
(74) *Attorney, Agent, or Firm* — Sheridan Ross P.C.

(57) ABSTRACT

A request to establish a communication session is received at a cloud communication application. The request is from a first enterprise communication device to establish a communication session with a second communication device that is typically also within the enterprise. In response to receiving the request to initiate the communication session, the cloud communication application directs the first enterprise communication device to use an enterprise media server for sending a media stream of the first communication session. This allows the cloud communication application to provide one or more cloud services for the media stream via (Continued)

a communication channel that has been previously established between the cloud communication application and the enterprise media server. This results in the media stream being sent within the enterprise, thus, providing enhanced security. In addition, less bandwidth is required because the media streams do not have to be sent to and from the cloud.

20 Claims, 6 Drawing Sheets

(56) References Cited

U.S. PATENT DOCUMENTS

| | | | | |
|---|---|---|---|---|
| 8,909,693 | B2* | 12/2014 | Frissora | G06F 9/543 |
| | | | | 709/203 |
| 9,094,889 | B2* | 7/2015 | Balasaygun | H04W 4/24 |
| 9,369,433 | B1* | 6/2016 | Paul | H04L 63/0227 |
| 9,594,885 | B2* | 3/2017 | Ao | H04L 63/029 |
| 2007/0064672 | A1* | 3/2007 | Raghav | H04L 43/0811 |
| | | | | 370/351 |
| 2009/0248800 | A1* | 10/2009 | Chu | H04L 29/12216 |
| | | | | 709/204 |
| 2012/0030232 | A1* | 2/2012 | John | G06Q 10/00 |
| | | | | 707/769 |
| 2012/0233334 | A1 | 9/2012 | Braudes et al. | |
| 2012/0269335 | A1* | 10/2012 | Goguen | H04L 63/0407 |
| | | | | 379/202.01 |
| 2012/0281823 | A1* | 11/2012 | Colbert | H04M 3/563 |
| | | | | 379/202.01 |
| 2013/0031243 | A1 | 1/2013 | Yoakum et al. | |
| 2014/0089457 | A1* | 3/2014 | Ohrstrom-Sandgren | G06F 8/65 |
| | | | | 709/217 |
| 2014/0126715 | A1 | 5/2014 | Lum et al. | |
| 2014/0247936 | A1* | 9/2014 | Shtilman | G06Q 10/10 |
| | | | | 379/265.03 |
| 2014/0267569 | A1* | 9/2014 | Periyannan | H04L 65/605 |
| | | | | 348/14.08 |

OTHER PUBLICATIONS

Extended Search Report for European Patent Application No. 15161437.7, dated Jan. 26, 2016 11 pages.
Official Action with English Translation for Korea Patent Application No. 2015-0045439, dated Dec. 15, 2015 9 pages.

* cited by examiner

HYBRID CLOUD MEDIA ARCHITECTURE FOR MEDIA COMMUNICATIONS

TECHNICAL FIELD

The systems and methods disclosed herein relate to cloud based communication systems and in particular to hybrid cloud media communication systems.

BACKGROUND

Today's communication applications typically deploy media processing infrastructure (e.g., media servers) in the same addressable network as application servers. The result is a deployment: 1) where both the media processing infrastructure and the communication application servers and are in the cloud (a cloud centric solution), or 2) where both the media processing infrastructure and the application servers are within an enterprise (an enterprise centric solution). A cloud centric solution is where infrastructure in a public or private cloud provides services for an enterprise.

With increasing demand from enterprises for open modeled cloud centric solutions, challenges occur when processing media in the cloud that require careful consideration. Purely cloud centric solutions have drawbacks. For instance, they may suffer from Quality of Service issues, security issues, higher bandwidth requirements, higher latency, and numerous efficiency issues.

SUMMARY

To overcome the problems of the existing art, a hybrid solution that provides cloud based applications and enterprise based media processing (media servers) is implemented. The result is a secure cloud based solution that is more efficient and secure than a wholly cloud based solution. A request to establish a communication session is received at a cloud communication application. The request is from a first enterprise communication device to establish a communication session with a second communication device that is typically also within the enterprise. In response to receiving the request to initiate the communication session, the cloud communication application directs the first enterprise communication device to use an enterprise media server for sending a media stream of the first communication session. This allows the cloud communication application to provide one or more cloud services for the enterprise media server via a communication channel that has been previously established between the cloud communication application and the enterprise media server. This results in a direct media path between the media server and the communication device, avoiding traversing the enterprise firewall/NAT. Media remains within the enterprise (not sent to/from the cloud), thus, providing enhanced security and predictable Quality of Service (QoS). In addition, less bandwidth is required because the media streams do not have to be sent to and from the cloud.

DETAILED DESCRIPTION

Figure 1:
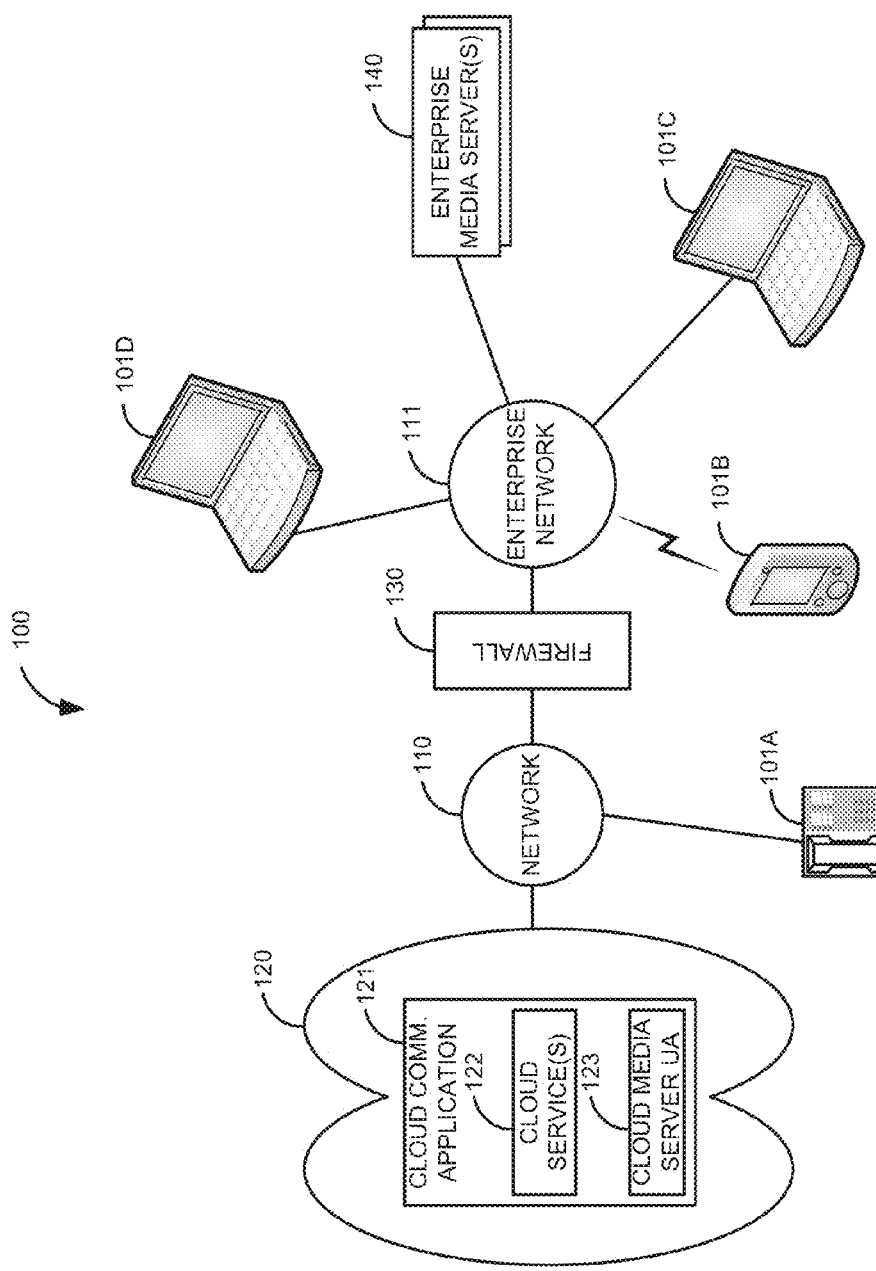
FIG. 1 is a block diagram of a first illustrative system of a hybrid cloud communication system.

FIG. 1 is a block diagram of a first illustrative system 100 of a hybrid cloud communication system. The first illustrative system 100 comprises communication devices 101A-101D, a network 110, an enterprise network 111, a cloud 120, a firewall 130, and an enterprise media server(s) 140.

The communication devices 101A-110D can be or may include any device that can communicate on the networks 110 and 111, such as a Personal Computer (PC), a telephone, a video phone, a cellular telephone, a Personal Digital Assistant (PDA), a tablet device, a notebook device, and/or the like. The communication devices 101A-101D are typically communication endpoints. However, in some embodiments, the communication devices 101A-101D can be a server that provides a media stream. FIG. 1 shows four communication devices 101A-101D; however, there may be any number of communication devices 101 connected to the communication networks 110 and 111. In FIG. 1, the communication devices 101B-101D are enterprise communication devices 101B-101D, while the communication device 101A is a non-enterprise communication device 101A.

The network 110 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Web Real-Time Communication (WebRTC) protocol, Integrated Services Digital Network (ISDN), and/or the like. The network 110 is typically an unsecure network, such as the Internet.

The enterprise network 111 can be or may include any collection of communication equipment that can send and receive electronic information on the enterprise network 111. The enterprise network 111 can be or may include a WAN, a LAN, a VoIP network, a circuit switched network, a packet switched network, a wireless network, and/or the like. The enterprise network 111 can use a variety of protocols, such as Ethernet, Internet Protocol (IP), Session Initiation Protocol (SIP), WebRTC, and/or the like. The enterprise network 111 is typically a private network that is used by a corporation, a group, a partnership, an organization, and/or the like. The enterprise network 111 is protected by the firewall 130.

The cloud 120 is a grouping of one or more services that can be provided to the enterprise. The cloud 120 comprises a cloud communication application 121. The cloud communication application 121 can be any hardware/software that can provide services for the enterprise. The cloud communication application 121 further comprises cloud service(s) 122 and a cloud media server User Agent (UA) 123.

The cloud service(s) 122 can be any service that can be provided by the cloud 120, such as, a recording service, a conferencing service, a call forwarding service, a voice recognition service, a voice to text service, a gesture recognition service, a word spotting service, and/or the like. The cloud service(s) 122, in one embodiment, can be one or more SIP Back-to-Back User Agents (B2BUAs) that can be inserted in the a SIP dialog that is initiated from one of the communication devices 101A-101D based on system or user preferences.

The cloud media server User Agent (UA) 123 is a SIP UA that is used to manage communications between the enterprise media server(s) 140 and the cloud communication application 121. The cloud media server UA 123 is a user agent that sends messages to the enterprise media server 140 for controlling the media stream in a communication session. The cloud media server UA 123 is used in embodiments where SIP is the primary protocol. However, in non-SIP environments, the cloud media server UA 123 may be a different user agent that supports a different protocol. For example, H.323, a video protocol, and/or the like.

The firewall 130 can be or may include any hardware that can provide protection services for the enterprise network 111, such as Network Address Translator (NAT), a proxy server, a firewall application, and/or the like.

The enterprise media server(s) 140 can be or may include any hardware/software that can provide media services. For example, the enterprise media server 140 can be used to monitor/control a Real-time Transport Protocol (RTP) stream, a Real-time Transport Control Protocol (RTCP) stream, an H.323 stream, and/or the like.

Figure 2:
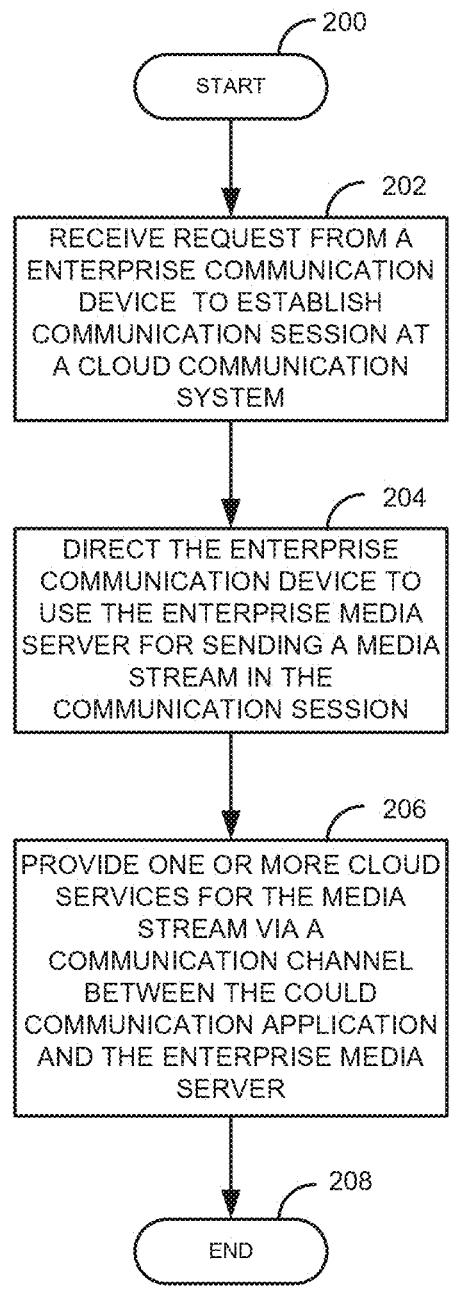
FIG. 2 is a flow diagram of a process for managing an enterprise media server via a cloud communication application.

FIG. 2 is a flow diagram of a process for managing an enterprise media server 140 via a cloud communication application 121. Illustratively, the communication devices 101A-101D, the network 110, the enterprise network 111, the cloud communication application 121, the cloud services 122, the cloud media server UA 123, the firewall 130, and the enterprise media server(s) 140 are stored-program-controlled entities, such as a computer or processor, which performs the method of FIGS. 2-6 and the processes described herein by executing program instructions stored in a tangible computer readable storage medium, such as a memory or disk. Although the methods described in FIGS. 2-6 are shown in a specific order, one of skill in the art would recognize that the steps in FIGS. 2-6 may be implemented in different orders and/or be implemented in a multi-threaded environment. Moreover, various steps may be omitted or added based on implementation.

The process starts in step 200. A request is received, in step 202, at the cloud communication application 121, from the enterprise communication device 101B, to establish a communication session with second communication device (e.g., the communication device 101A or the enterprise communication device 101C). The request to establish the communication session can be any type of request to establish a communication session, such as a SIP INVITE, A WebRTC request, a H.323 request, a request for a video communication session, a request for a text communication session, and/or the like.

In response to receiving the request to initiate the communication session in step 202, the cloud communication application 121 directs the enterprise communication device 101B to use the enterprise media server 140 for sending a media stream in the communication session in step 204. The media stream can be, for example, a voice media stream, a video media stream, an Instant Messaging (IM) media stream, a text media stream, and/or the like. The cloud communication application 121 can direct the enterprise communication device to use the enterprise media server 140 in various ways, such as responding to a SIP INVITE (with a Session Description Protocol (SDP) offer) with a SIP 200 OKAY message (with a SDP answer) that contains the address/port of the enterprise media server 140, responding to a WebRTC request with the address/port of the enterprise media server 140, responding to a H.323 request by sending the address of the enterprise media server 140, responding to a video request by sending the address of the enterprise media server 140, and the like.

The cloud communication application 121 provides one or more cloud services 122 for the media stream in step 206. The cloud services 122 are provided via a communication channel between the cloud communication application 121 and the enterprise media server 140. The process then ends in step 208.

To illustrate, consider the following example. The enterprise communication device 101B sends a request to establish a voice communication session to the cloud communication application 121. The request is to establish a voice communication session with the enterprise communication device 101D. The cloud communication application 121 directs the enterprise communication device 101B by sending an acknowledgment that includes an address/port of the enterprise media server 140. A similar process is completed by the cloud communication application 121 for the enterprise communication device 101D. The enterprise communication device 101B sends a voice stream to the enterprise media server 140, which in turn sends to voice stream to the enterprise communication device 101D.

A recording application (e.g., cloud service 122) provides a recording service via a channel that is established between the cloud communication application 121 and the enterprise media server 140. Once the recording is complete, the recording of the voice communication session is stored in the cloud 120.

In one embodiment, the cloud media server UA 123 can serve a plurality of media enterprise media servers 140. The relationship is not 1 to 1. The location of the media server 140 can be provided to the cloud media server UA 123 during initial connectivity, allowing the cloud media server UA 123 to better choose a cloud media server UA 123 based on the location of the enterprise media server 140. Also, to improve security, the connection from the enterprise media server 140 to the cloud media server UA 123 uses mutual Transport Layer Security (TLS) authentication. In this case the enterprise media server 140 authenticates the cloud media server UA 123, and the cloud media server UA 123 authenticates the enterprise media server 140.

Figure 3:
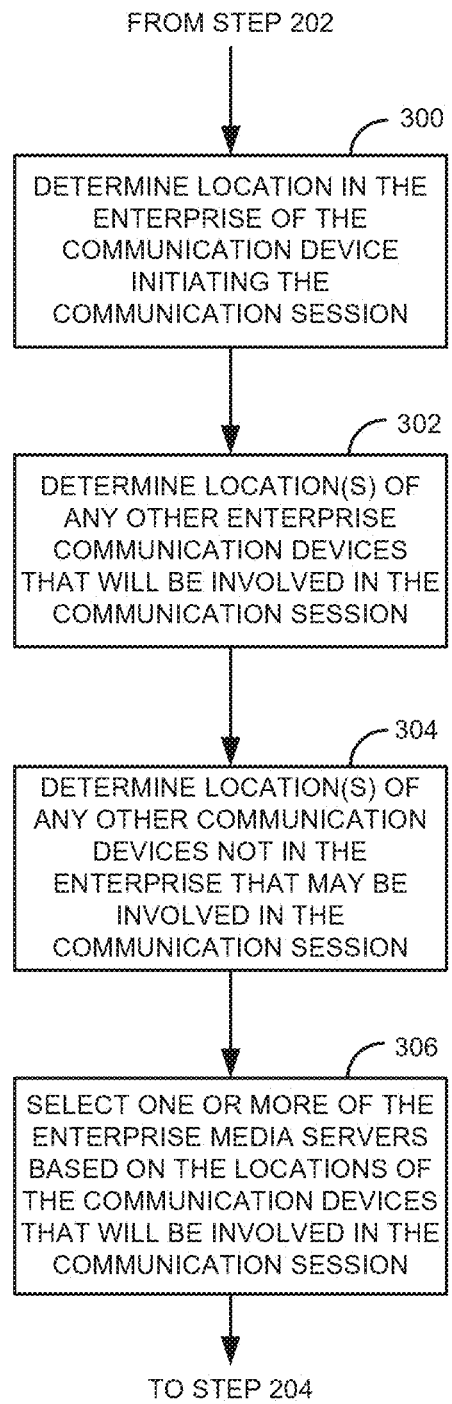
FIG. 3 is a flow diagram of a process for selecting an enterprise media server.

FIG. 3 is a flow diagram of a process for selecting an enterprise media server 140. After completing step 202 in FIG. 2, the cloud communication application 121 determines the location in the enterprise of the communication device 101B initiating the communication session in step 300 (e.g., the location of the enterprise communication device 101B). The cloud communication application 121 can determine the location of the enterprise communication device 101B in various ways, such as, based on a particular wireless network that the enterprise communication device 101B is connected to, based on an assigned port or trunk, based on an IP address, based on a Media Access Control (MAC) address, based on an assigned location (e.g., for a hardwired communication device), based on a telephone number, based on an address of record, based on a SIP address, and/or the like.

The cloud communication application 121 determines the location(s) of any other enterprise communication devices (e.g., enterprise communication devices 101C-101D) that will be involved in the communication session in step 302. The locations of the other enterprise communications devices 101C-101D can be determined in a similar manner as in step 300.

The cloud communication application 121 determines the locations of any other communication devices 101 not in the enterprise (e.g., communication device 101A) that may be involved in the communication session in step 304. The location of the other communication devices 101 not involved in the communication session can be determined based on a network address, an IP address, a telephone number, and/or the like.

The cloud communication application 121 selects one or more enterprise media servers 140 based on the locations of the communication devices 101 that will be involved in the communication session in step 306. The process then goes to step 204. The cloud communication application 121 can select the enterprise media server 140 based on the enterprise media server 140 being the closest media enterprise server 140 to the communication devices 101 involved in the communication session.

In one embodiment, the cloud communication application 121 can select two enterprise media servers 140 for providing two types of media. For example, one enterprise media server 140 may be for a voice communication session and a second enterprise media server 140 may be for a concurrent Instant Messaging session that occurs during the voice communication session. Alternatively, the cloud communication application 121 select one enterprise media server 140 in a first location (to provide media services for the first user) and a second enterprise media server 140 at a second location (to provide media services for a second user). If there are a group of communication devices 101 that are located by an enterprise media server 140, the cloud communication application 121 can select the enterprise media server closest to the group.

Figure 4:
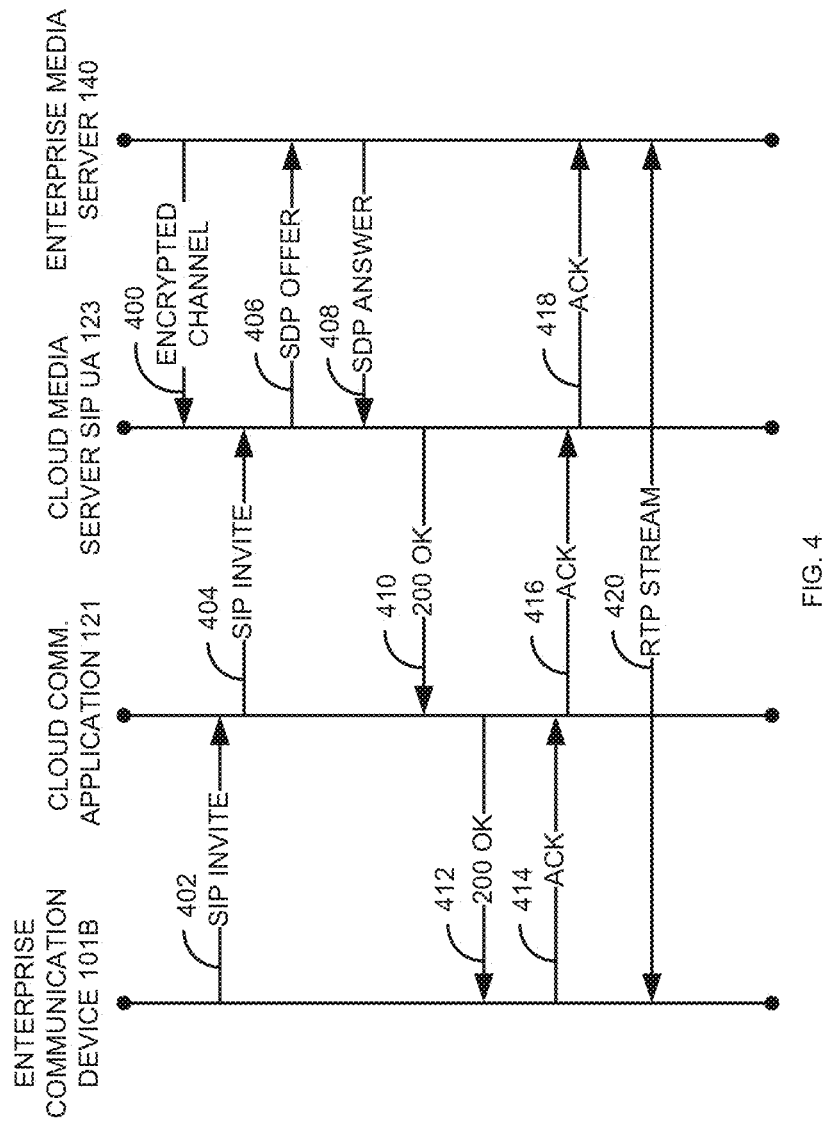
FIG. 4 is a flow diagram of a process for managing an enterprise media server via a cloud communication application using Session Initiation Protocol (SIP).

FIG. 4 is a flow diagram of a process for managing an enterprise media server 140 via a cloud communication application 121 using Session Initiation Protocol (SIP). The process starts in step 400 when the enterprise media server 140 contacts the cloud media server SIP UA 123 and establishes a communication channel. The communication channel is typically encrypted. The communication channel can use different protocols than the communication session. The communication channel could be Virtual Private Network tunnel to the enterprise media server 140. Because the communication channel is established based on the enterprise media server 140 sending a request to the cloud media server SIP UA, the system is more secure and does not require administration of the firewall 130 to setup a port for an incoming channel.

The enterprise communication device 101B sends a SIP INVITE to the cloud communication application 121 in step 402. The SIP INVITE includes a Session Description Protocol (SDP) offer. The SIP INVITE is to establish a communication session between the enterprise communication device 101B and the enterprise communication device 101C. The cloud communication application 121 sends the SIP INVITE with the SDP offer to the cloud media server SIP UA 123 in step 404. In response, the cloud media server SIP UA 123 sends the SDP offer to the enterprise media server 140 in step 406. The enterprise media server 140 now has the information necessary (from the SDP offer) to establish a media stream with the enterprise communication device 101B.

The enterprise media server 140 sends an SDP answer to the cloud media server SIP UA 123 in step 408. The SDP answer contains SDP information about the enterprise media server 140. The cloud media server SIP UA 123 sends a 200 OK that includes the SDP answer to the cloud communication application 121 in step 410. The cloud communication application 121 sends the 200 OK with the SDP answer to the enterprise communication device 101B in step 412. At this point, the enterprise communication device 101B and the enterprise media server 140 have the necessary information to establish (provide) a media stream between the enterprise communication device 101B and the enterprise media server 140.

The enterprise communication device 101B sends an ACK to the cloud communication application 121 in step 414. The cloud communication application 121 sends the ACK to the cloud media server SIP UA 123 in step 416. The cloud media server SIP UA sends the ACK to the enterprise media server 140 in step 418. This establishes a SIP dialog between the enterprise media server 140 and the enterprise communication device 101B. A similar process is completed between the cloud communication application 121, the cloud media server SIP UA 123, the enterprise media server 140, and the enterprise communication device 101C to establish a SIP dialog between the enterprise media server 140 and the enterprise communication device 101C.

The enterprise communication device 101B can now send a media stream to the enterprise media server 140 (step 420), which in turn sends the media stream to the enterprise communication device 101C. The media stream can be, for example, a Real-Time Protocol (RTP) or a Real-Time Control Protocol (RTCP) stream.

Figure 5:
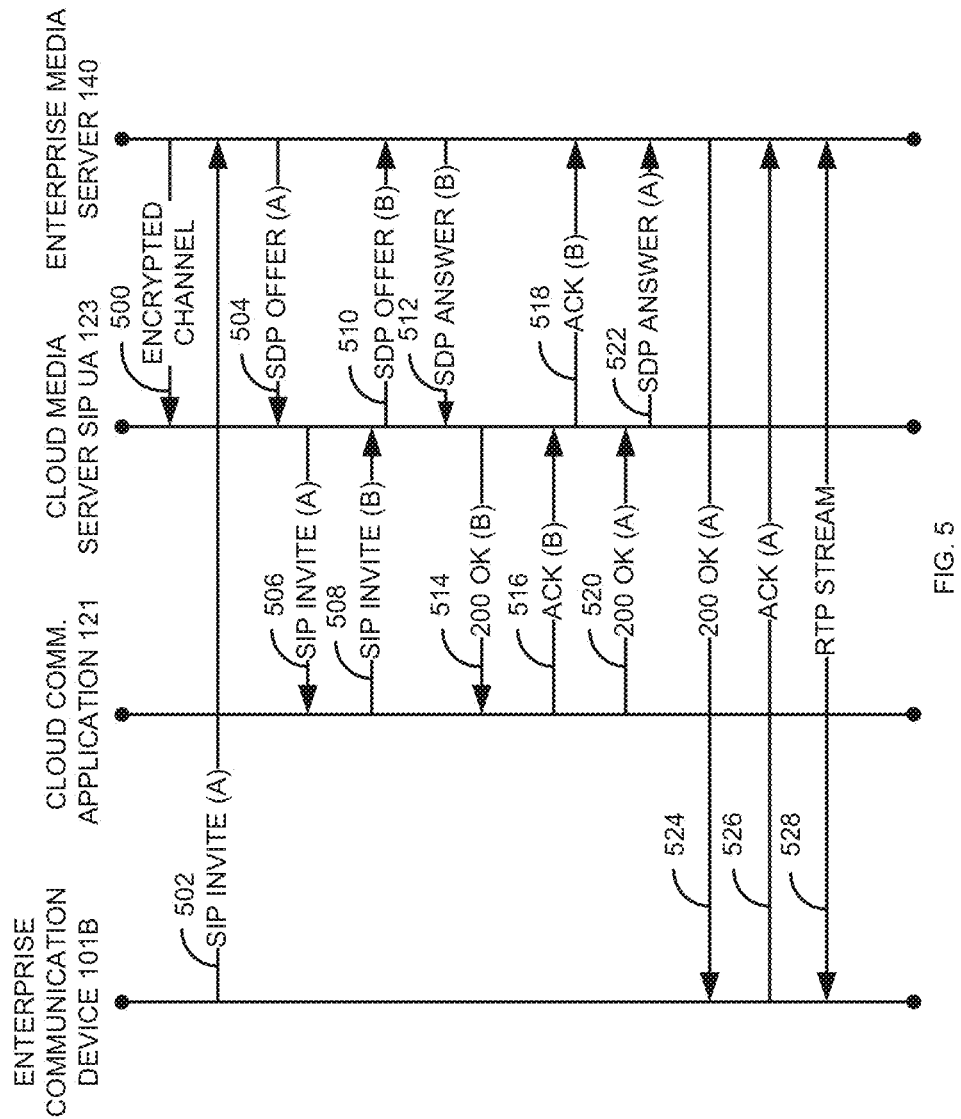
FIG. 5 is a flow diagram of a process for managing an enterprise media server via a cloud communication application using Session Initiation Protocol (SIP).

FIG. 5 is a flow diagram of a process for managing an enterprise media server 140 via a cloud communication application 121 using Session Initiation Protocol (SIP). The process starts in step 500 when the enterprise media server 140 contacts the cloud media server SIP UA 123 and establishes a communication channel. The communication channel is typically encrypted. The communication channel can use a protocol that is different from SIP. The communication channel can be Virtual Private Network tunnel to the enterprise media server 140.

The enterprise communication device 101B sends a SIP INVITE with a SDP offer (A) to the enterprise media server 140 in step 502 (for establishing a SIP dialog between the enterprise media device 101B and the enterprise media server 140, noted by (A) in FIG. 5). The enterprise media server 140 redirects the SIP INVITE by sending the SDP offer (A) to the cloud media server SIP UA 123 in step 504. The cloud media server SIP UA 123 sends a second SIP INVITE (a redirection the SIP INVITE sent in step 502) with the SDP offer (A) to the cloud communication application 121 in step 506.

In response, the cloud communication application 121 sends a SIP INVITE with a SDP offer (B) to establish a second SIP dialog (dialog B in FIG. 5) with the enterprise media server 140 in step 508. The cloud media server SIP UA 123 sends the SDP offer (B) to the enterprise media server 140 in step 510. The enterprise media server 140 responds by sending a SDP answer (B) to the cloud media server SIP UA 123 in step 512. The cloud media server SIP UA 123 sends a 200 OK with the SDP answer (B) to the cloud communication application 121 in step 514. The cloud communication application 121 sends a SIP ACK (B) in step 516 to the cloud media server SIP UA 123. The cloud media server SIP UA 123 sends the ACK (B) to the enterprise media server 140 to setup the SIP dialog (B) between the cloud communication application 121 and the enterprise media server 140 in step 518. Dialog (B) is used by the cloud communication application 121 to control the enterprise media server 140. For example, to control the enterprise media server 140 from one or more services 122 (e.g., one or more B2BUAs).

Once dialog (B) is established, the cloud communication application 121 sends a 200 OK (in response to the SIP INVITE received in step 506 for dialog A) with an SDP answer (A) to the cloud media server SIP UA 123 in step 520. The cloud media server SIP UA 123 sends the SDP answer (A) to the enterprise media server 140 in step 522. The enterprise media server 140 sends a 200 OK with the SDP answer (A) in response to the SIP INVITE sent in step 502 to the enterprise communication device 101B in step 524. The enterprise communication device 101B sends a SIP ACK (A) to the enterprise media server 140 in step 526. The dialog (A) has now been established. A similar process is completed between the cloud communication application 121, the cloud media server UA 123, the enterprise media server 140, and the enterprise communication device 101C.

The enterprise communication device 101B can now send a media stream to the enterprise media server 140 (step 528), which in turn sends the media stream to the enterprise communication device 101C. The media stream can be, for example, a Real-Time Protocol (RTP) or a Real-Time Control Protocol (RTCP) stream.

Figure 6:
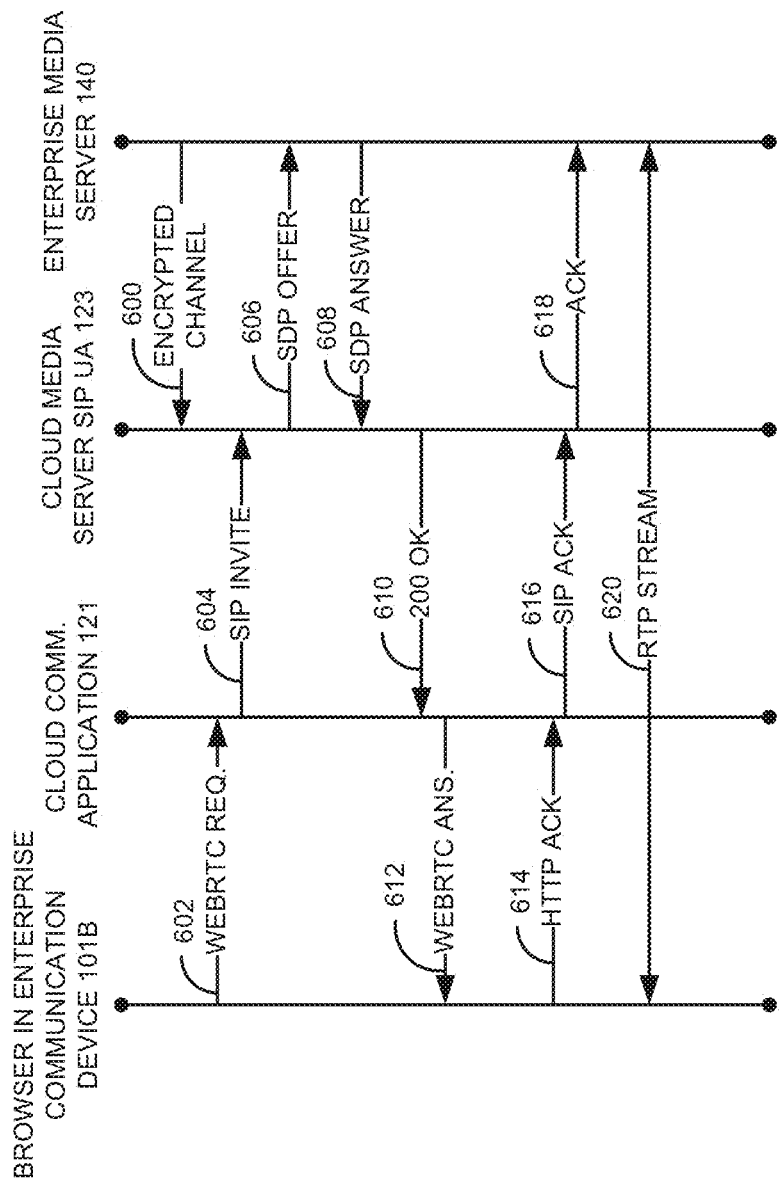
FIG. 6 is a flow diagram of a process for managing an enterprise media server via a cloud communication application using Web Real Time Protocol (WebRTC).

FIG. 6 is a flow diagram of a process for managing an enterprise media server 140 via a cloud communication application 121 using Web Real Time Protocol (WebRTC). The process starts in step 600 when the enterprise media server 140 contacts the cloud media server SIP UA 123 and establishes a communication channel. The communication channel is typically encrypted. The communication channel can use different protocols, such a TCP/IP. The communication channel may be Virtual Private Network tunnel to the enterprise.

A browser in the enterprise communication device 101B sends a Web RTC request via the Hyper Text Transfer Protocol (HTTP) to the cloud communication application 121 in step 602. The WebRTC request includes an SDP offer. In response, the cloud communication application 121 sends a SIP INVITE with the SDP offer to the cloud media server SIP UA 123 in step 604. The cloud media server SIP UA 123 sends the SDP offer to the enterprise media server 140 in step 606. The enterprise media server 140 sends an SDP answer to the cloud media server SIP UA 123 in step 608. The cloud media server SIP UA 123 sends a 200 OK with the SDP answer in step 610 to the cloud communication application 121. The cloud communication application 121 sends a WebRTC answer with the SDP answer to the browser in the enterprise communication device 101B in step 612. The browser in the enterprise communication device 101B sends an HTTP ACK to the cloud communication application 121 in step 614. The cloud communication application 121 sends a SIP ACK to the cloud media server SIP UA 123 in step 616. The cloud media server SIP UA 123 sends an ACK to the enterprise media server 140. A similar process is completed between the cloud communication application 121, the cloud media server UA 123, the enterprise media server 140, and the enterprise communication device 101C.

The enterprise communication device 101B can now send a media stream to the enterprise media server 140 (step 528), which in turn sends the media stream to the enterprise communication device 101C. The media stream can be, for example, a Real-Time Protocol (RTP) or a Real-Time Control Protocol (RTCP) stream.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing communication sessions comprising:
   receiving, by a microprocessor, a request to establish a communication session at a cloud communication application, wherein the request is from a first enterprise communication device to establish a first communication session with a second enterprise communication device and wherein the cloud communication application is external from an enterprise network that comprises the first and second enterprise communication devices;
   in response to receiving the request to establish the first communication session, directing, by the microprocessor, the first enterprise communication device to directly use an enterprise media server for sending a media stream of the first communication session, wherein the media stream of the first communication session is sent within the enterprise network; and
   providing, by the microprocessor, one or more cloud services for the media stream of the first communication session via a separate communication channel between the cloud communication application and the enterprise media server.

2. The method of claim 1, wherein the separate communication channel is established by the enterprise media server contacting a cloud media server Session Initiation Protocol (SIP) User Agent (UA) prior to the request to establish the first communication session at the cloud communication application.

3. The method of claim 1, wherein the first and second enterprise communication devices are on the enterprise network, wherein the enterprise media server comprises a plurality of enterprise media servers, and further comprising:
   determining locations of the first and second enterprise communication devices within the enterprise network; and
   in response to determining the locations of the first and second enterprise communication devices within the enterprise network, selecting one or more of the plurality of enterprise media servers as the enterprise media server for use by the first enterprise communication device based on the locations of the first and second enterprise communication devices within the enterprise.

4. The method of claim 1, wherein the request is a first Session Initiation Protocol (SIP) INVITE, and wherein a second SIP INVITE is initially sent to the enterprise media server and then redirected by the enterprise media server to the cloud communication application via the separate communication channel.

5. The method of claim 4, where the redirecting step comprises:

in response to receiving the second SIP INVITE, sending a Session Description Protocol offer to a cloud media server SIP User Agent (UA); and sending the first SIP INVITE from the could media server UA to the cloud communication application.

6. The method of claim 5, wherein a first Session Initiation Protocol (SIP) dialog between the cloud communication application and the SIP cloud media server UA is established via the separate communication channel and wherein a second SIP dialog between the media server and the first enterprise communication device is established.

7. The method of claim 1, wherein the one or more cloud services are one or more Session Initiation Protocol (SIP) Back-to-Back User Agents (B2BUAs) and further comprising: creating a SIP dialog between the enterprise media server and the first enterprise communication device via the cloud communication application and the one or more B2BUAs.

8. The method of claim 1, wherein the request is a Web Real Time Communication (WebRTC) request.

9. The method of claim 8, further comprising:
in response to receiving the WebRTC request, sending a Session Initiation Protocol (SIP) INVITE to a cloud media server User Agent (UA).

10. A system for managing communication sessions comprising:
a microprocessor; and
a computer readable medium, coupled with the microprocessor and comprising microprocessor readable and executable instructions that program the microprocessor to execute:
a cloud communication application that receives a request to establish a first communication session, wherein the request is from a first enterprise communication device to establish the first communication session with a second enterprise communication device and wherein the cloud communication application is external from an enterprise network that comprises the first and second enterprise communication devices, directs the first enterprise communication device to directly use an enterprise media server for sending a media stream of the first communication session in response to receiving the request to establish the communication session, and provides one or more cloud services for the media stream via a separate communication channel between the cloud communication application and the enterprise media server, wherein the media stream of the first communication session is sent within the enterprise network.

11. The system of claim 10, wherein the first and second enterprise communication devices are on the enterprise network, wherein the enterprise media server comprises a plurality of enterprise media servers, and wherein the cloud communication application determines locations of the first and second enterprise communication devices within the enterprise network and selects one or more of the plurality of enterprise media servers as the enterprise media server for use by the first enterprise communication device based on the locations of the first and second enterprise communication devices within the enterprise network.

12. The system of claim 10, wherein the request is a Session Initiation Protocol (SIP) INVITE, wherein the SIP INVITE is sent directly to the cloud communication application.

13. The system of claim 10, wherein the request is a first Session Initiation Protocol (SIP) INVITE, wherein a second SIP INVITE is initially sent to the enterprise media server and then redirected by the enterprise media server to the cloud communication application via the separate communication channel.

14. The system of claim 13, where the media server sends a Session Description Protocol offer to a cloud media server User Agent (UA) in response to receiving the second SIP INVITE and the cloud media server UA sends the first SIP INVITE to the cloud communication application.

15. The system of claim 14, wherein a first Session Initiation Protocol (SIP) dialog between the cloud communication application and the SIP cloud media server UA is established via the separate communication channel and wherein a second SIP dialog between the media server and the first enterprise communication device is established.

16. The system of claim 10, wherein the one or more cloud services are one or more Session Initiation Protocol (SIP) Back-to-Back User Agents (B2BUAs), wherein the cloud communication application creates a SIP dialog between the enterprise media server and the first enterprise communication device via the cloud communication application and the one or more B2BUAs.

17. The method of claim 10, wherein the request is a Web Real Time Communication (WebRTC) request.

18. The system of claim 17, wherein the cloud communication application sends a Session Initiation Protocol (SIP) INVITE to a cloud media server User Agent (UA) response to receiving the WebRTC request.

19. The system of claim 10, wherein the cloud communication application directs the first enterprise communication device to use the enterprise media server by sending a message to the first enterprise communication device with an address of the enterprise media server.

20. The system of claim 10, wherein the media stream does not go through the cloud application and goes through the enterprise media server.

* * * * *

UNITED STATES PATENT AND TRADEMARK OFFICE
CERTIFICATE OF CORRECTION

PATENT NO.         : 9,906,568 B2
APPLICATION NO.    : 14/472206
DATED              : February 27, 2018
INVENTOR(S)        : Stephen R. Whynot, David Mcknight and Greg Osterhout It is certified that error appears in the above-identified patent and that said Letters Patent is hereby corrected as shown below:

At Column 9, Line 43, after "to establish the" insert --first-- therein.

Signed and Sealed this
Seventeenth Day of April, 2018

Andrei Iancu
*Director of the United States Patent and Trademark Office*